(12) United States Patent
Kim

(10) Patent No.: US 7,344,087 B2
(45) Date of Patent: Mar. 18, 2008

(54) IC CARD, IC CARD PROCESSOR AND IC CARD SYSTEM TO IMPROVE DATA TRANSMISSION SPEED

(75) Inventor: Yong-Wook Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 469 days.

(21) Appl. No.: 10/969,509

(22) Filed: Oct. 20, 2004

(65) Prior Publication Data

US 2005/0092847 A1 May 5, 2005

(30) Foreign Application Priority Data

Nov. 5, 2003 (KR) ...................... 10-2003-0078056

(51) Int. Cl.
- *G06K 19/06* (2006.01)
- *G06K 7/08* (2006.01)
- *H04J 1/00* (2006.01)
- *H04J 9/00* (2006.01)
- *H04L 5/04* (2006.01)

(52) U.S. Cl. ...................... 235/492; 235/449; 235/451; 370/343; 370/206; 370/204

(58) Field of Classification Search ................ 235/492, 235/449, 451; 370/343, 204, 206
See application file for complete search history.

(56) References Cited

U.S. PATENT DOCUMENTS

| | | | | |
|---|---|---|---|---|
| 4,691,202 A | * | 9/1987 | Denne et al. | ............... 340/10.2 |
| 5,068,521 A | * | 11/1991 | Yamaguchi | .................. 235/492 |
| 5,459,304 A | * | 10/1995 | Eisenmann | .................. 235/380 |
| 5,517,194 A | * | 5/1996 | Carroll et al. | ........... 340/10.34 |
| 5,812,942 A | * | 9/1998 | Allen et al. | .................. 455/139 |
| 6,036,100 A | * | 3/2000 | Asami | ......................... 235/492 |
| 6,126,077 A | * | 10/2000 | Tanaka et al. | ............... 235/492 |
| RE37,637 E | * | 4/2002 | Clifton et al. | .............. 257/679 |
| 6,434,171 B1 | * | 8/2002 | Ishida | ......................... 370/537 |
| 6,567,394 B1 | * | 5/2003 | Arisawa | ...................... 370/343 |
| 6,577,229 B1 | * | 6/2003 | Bonneau et al. | ......... 340/10.41 |
| 7,106,781 B2 | * | 9/2006 | Agee et al. | .................. 375/141 |
| 7,120,202 B2 | * | 10/2006 | Sasabata | ...................... 375/271 |
| 7,227,449 B2 | * | 6/2007 | Bonneau et al. | ......... 340/10.41 |
| 2002/0015436 A1 | * | 2/2002 | Ovard et al. | ................. 375/130 |
| 2002/0096568 A1 | * | 7/2002 | Arisawa | ...................... 235/492 |
| 2002/0174286 A1 | * | 11/2002 | Tamura | ........................ 711/4 |
| 2003/0137404 A1 | * | 7/2003 | Bonneau et al. | ......... 340/10.41 |
| 2004/0110533 A1 | * | 6/2004 | Yamagata et al. | .......... 455/558 |
| 2005/0092847 A1 | * | 5/2005 | Kim | ............................. 235/492 |

(Continued)

FOREIGN PATENT DOCUMENTS

| | | | |
|---|---|---|---|
| JP | 11120307 A | * | 4/1999 |
| WO | WO 01/95244 A1 | | 12/2002 |

*Primary Examiner*—Daniel Walsh
(74) *Attorney, Agent, or Firm*—F. Chau & Assoc. LLC

(57) ABSTRACT

An IC card system for transceiving data signal between an IC card processor and an IC card in the manner of non-contact are provided. The IC card modulates the signal to be transmitted to the processor in the manner of Quadrature Amplitude Modulation and generates the modulated signal. A card reader demodulates the signal received from the IC card in the manner of QAM. The rate of the data signal transmitted from the IC card to the card reader is improved.

11 Claims, 5 Drawing Sheets

ASK 10%
NRZ-L, 106kbit/s

Load Modulation
Sub carrier fc/16
BPSK
NRZ-L*, 106kbit/s

U.S. PATENT DOCUMENTS

2005/0225437 A1* 10/2005 Shiotsu et al. ........... 340/10.51
2006/0038024 A1* 2/2006 Nakadai et al. ............. 235/492
2006/0279422 A1* 12/2006 Sweatte ................. 340/539.13
2007/0171714 A1* 7/2007 Wu et al. .............. 365/185.09

* cited by examiner

IC CARD, IC CARD PROCESSOR AND IC CARD SYSTEM TO IMPROVE DATA TRANSMISSION SPEED

TECHNICAL FIELD

The present invention relates to an integrated Circuit (IC) card, more particularly, to data communication using an IC card system transceiving data in a non-contact manner.

DISCUSSION OF THE RELATED ART

Since the 1920's, when the credit card appeared for the first time, the use of cards has been spreading. Different types of cards are now in use such as a cash card, a credit card, an identification card, a stock card, a department store card, etc. Recently, Integrated Circuits (IC) cards have been placed in the cards to provide multipurpose functions. Some cards have onboard processing features in addition to information embedded in the cards.

The IC card can have a shape of a Chip on Board (COB), which a plastic card is having the same size and thickness as a credit card with a chip of 0.5 mm thickness mounted thereon. The IC card can have identical shape and size when compared to the conventional magnetic strip card, and includes a contact type IC card, two kinds of wireless Contactless IC Cards (CICCs) and a Remote Coupling Communication Card (RCCC). The International Organization for Standardization (ISO) and the International Electro technical Commission (IEC) provide a form of world standard for IC cards. The ISO/IEC 14443 defines protocols with respect to the physical characteristic, wireless frequency power supply, signal contact, initialization and prevention of corroding.

According to the ISO/IEC 14443, the non-contact IC card includes an Integrated Circuit (IC) for performing a processing and/or a memory function. The non-contact IC card does not use a galvanic element, but it uses a proximity coupling device (i.e., an inductive coupling with a card reader) to exchange signals and to receive a power supply. A card read/write device (referred to as a "card reader" hereinafter), i.e., an IC card processor, for combining a non-contact IC card that generates energy of Radio Frequency (RF) field and delivers a power supply to a non-contact type IC card.

The IC card is a plastic card of the same size as the credit card with semiconductor devices mounted thereon, and is usually more secure than a conventional card with a magnetic stripe stacked thereto in terms of possible loss of data. The IC card is gaining in popularity as a next-age multimedia information medium.

The IC card system for using an IC card can be used in ticket examination systems, room entry/exit systems, etc., in the field of transportation. The IC card systems are designed to exchange various data between the IC card and the card reader. The card reader modulates a data sequence with a carrier wave signal having a predetermined frequency to compose a transmission signal, and transmits a transmission signal to the IC card through an antenna.

The IC card receives a transmission signal through an antenna, and demodulates the transmission signal to extract data transmitted from the card reader. The IC card modulates data such as private information stored on the IC card with a predetermined carrier and then transmits such modulated information to the card reader in response to the received data. The card reader receives the data transmitted from the IC card and examines whether a fee is paid, or permits an action controlled by the card reader.

FIG. 1A and FIG. 1B illustrate an example of a communication signal for a B type interface of ISO/IEC. The signal in FIG. 1A is transmitted from the card reader to the IC card. The signal in FIG. 1B is transmitted from the card reader to the IC card. The standard of ISO/IEC 14443 describes communication signal contacts of two types, i.e., types of A and B. The communication from the card reader according to a double ISO/IEC B type to the non-contact type IC card uses a method of amplitude shift keying 10% modulation and a non-return to zero (NRZ) coding in a range of RF operation. A bit rate or a data rate of signal transmitted from the card reader to the IC card is fc/128, that is, 106 kbps (but, fc is 13.56 MHz).

The transmission signal from the IC card to the card reader is modulated such as Binary Phase Shift Key (BPSK) which transmits only one bit during a one bit duration.

Recently, the IC card system application area has undergone changes. If the amount of data transceived between the IC card and the card reader is large, then the time needed for transceiving data tends to be longer.

SUMMARY OF THE INVENTION

At least one feature of the present invention is to provide an IC card system having an improved data rate.

It is another feature of the present invention to provide an IC card having improved data rate by outputting a modulated signal.

It is a still another feature of the present invention to provide a card processor for demodulating a modulated signal provided from an IC card.

In accordance with a preferred embodiment of the present invention, an IC card for transceiving data signal in the manner of non-contact with a predetermined process, includes a signal processing circuit, a modulator for performing Quadrature Amplitude Modulation Amplitude Modulation (QAM) to a data signal from the signal processing circuit and generating a transmission signal, and an antenna for transmitting the transmission signal modulated by the modulator.

In at least one embodiment, the modulator includes a serial-parallel converter for converting a serial signal to be transmitted to the processor into a parallel signal, a first level converter for converting a level of the first channel signal from the serial-parallel converter and a first multiplier for modulating a signal of which level is converted by the first level converter with a first carrier wave signal and outputting a first modulating signal.

Further, the modulator includes a second level converter for converting a level of the second channel signal from the serial-parallel converter, a second multiplier for modulating the signal of which level is converted by the second level converter with a second carrier wave signal and outputting a second modulating signal, and a synthesizer for synthesizing the first modulating signal from the first multiplier and the second modulating signal from the second multiplier.

In this embodiment, a carrier wave extractor and a phase shifter are included in the modulator. The carrier wave extractor extracts the first carrier wave signal from a reception signal received by the antenna. The phase shifter generates the second carrier wave signal by shifting a phase of the first carrier wave signal.

In a further embodiment, a demodulator is further included. The demodulator performs an Amplitude Shift Keying (ASK) 10% modulation and a Non-Return to Zero (NRZ) coding according to the standard of ISO/IEC B type.

In an another embodiment, an IC card processor for transceiving a data signal without being in contact with the IC card, comprises a signal processing circuit, an antenna for receiving a reception signal from the IC card, and a demodulator for demodulating the reception signal received by the antenna in the manner of Quadrature Amplitude Modulation (QAM) and providing the demodulated data signal to the signal processing circuit.

In a further embodiment, the demodulator includes a first multiplier for multiplying the reception signal received by the antenna by a first signal, a first level converter for converting a level of the signal from the first multiplier, a second multiplier for multiplying a signal received by the antenna by a second signal, a second level converter for converting a level of the signals outputted from the second multiplier, and a parallel-serial converter for receiving a signal from the first and second level converters to output a serial signal. The serial signal is restored from the signal transmitted from the IC card.

In this embodiment, a generator and a phase shifter are further included. The generator generates the first signal having a predetermined frequency and the phase shifter generates the second signal by shifting the first signal.

In still another embodiment, the IC card of the IC card system for transceiving a data signal in anon-contact manner between the IC card processor and the IC, includes a first antenna for receiving a transmission signal from the IC card processor, a first modulator for modulating a signal to transmit to the processor in the manner of Quadrature Amplitude Modulation (QAM). The transmission signal modulated by the first modulator is transmitted through the first antenna. The IC card processor includes a second antenna for receiving a reception signal from the IC card, a second demodulator for demodulating the reception signal from the IC card by performing QAM on the reception signal received from the second antenna so that the reception signal is restored, and a second modulator for modulating the signal to transmit to the IC card and generating a transmission signal. The transmission signal that is modulated by the modulator is transmitted through the second antenna.

BRIEF DESCRIPTION OF THE DRAWINGS

Preferred embodiments of the invention are described with reference to the accompanying drawings, of which:

FIG. 5 is a phasor diagram of a transmission signal outputted from a synthesizer.

DETAILED DESCRIPTION OF THE PREFERRED EMBODIMENTS

The preferred embodiments of the present invention will be described with reference to the appended drawings.

Figure 1A:
FIGS. 1A and 1B are drawings of a communication signal for B type interface of ISO/IEC 14443.
Figure 1B:
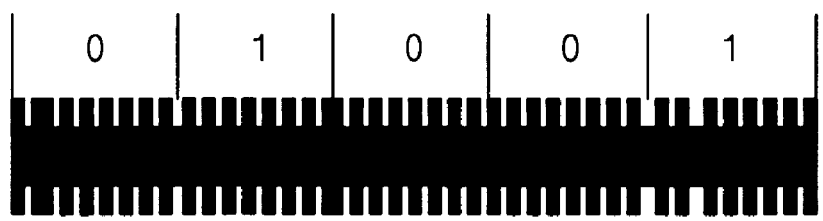
Figure 2:
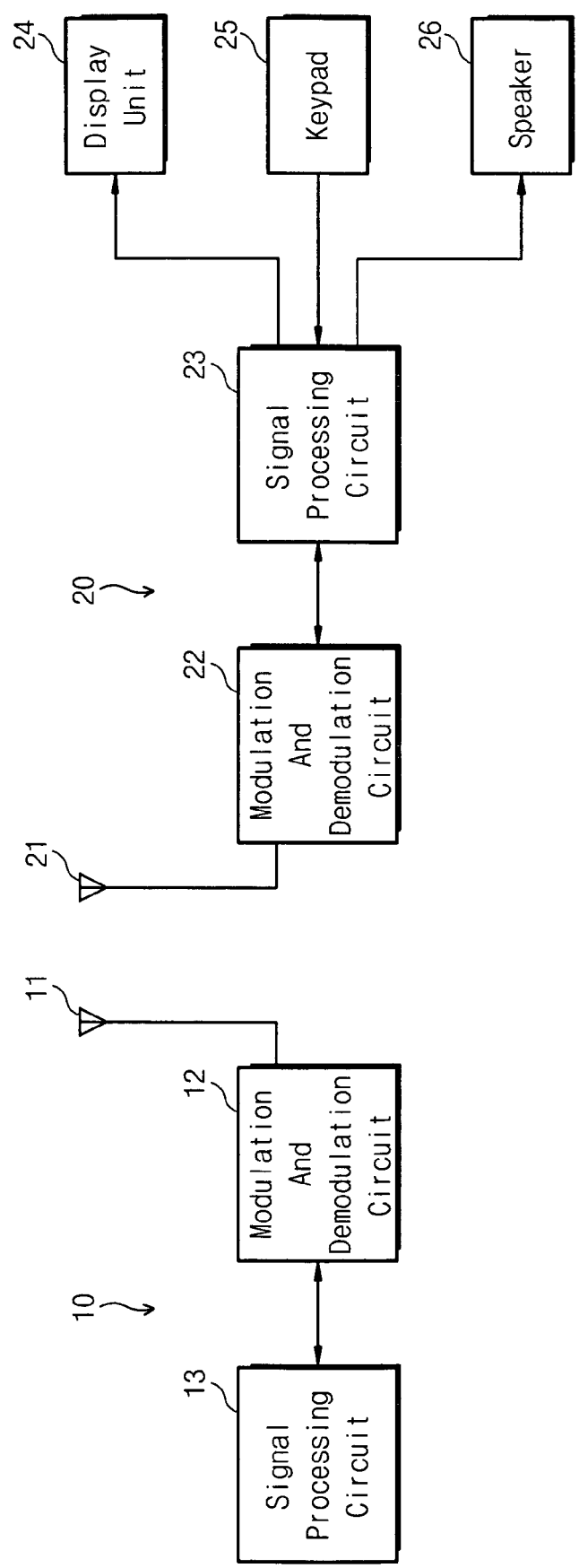
FIG. 2 is a drawing of an IC card system according to the present invention.

FIG. 2 is an IC card system according to an exemplary embodiment of the present invention. Referring to FIG. 2, the IC card system 1 includes an IC card 10 and an IC card processor (i.e., a card reader 20). The IC card 10 includes an antenna 11, a modulation-demodulation circuit 12 and a signal processing circuit 13. The card reader 20 includes an antenna 21, a demodulation circuit 22, a signal processing circuit 23, a display unit 24, a keypad 25 and a speaker 26.

An antenna 11 is coupled with an antenna 21 of the card reader 20. The antenna 11 receives a signal transmitted from the antenna 21 and generates a signal as generated by the modulation-demodulation circuit 12.

The modulation-demodulation circuit 12 generates an electric power for an operation of the IC card 10, a clock signal, etc., from the transmission signal. The modulation-demodulation circuit 12 is driven by the electrical power and the clock signal, demodulates a transmission signal received from the card reader 20, and generates a data signal to the signal processing circuit 23.

The data signal from the signal processing circuit 12 is modulated by the modulation-demodulation circuit 12 in the manner of Quadrature Amplitude Modulation (QAM) and outputted through an antenna 11.

In the card reader 20, the modulation-demodulation circuit 22 converts data to be transmitted from the signal processing circuit 23 to a transmission signal, and drives the antenna 21 by the transmission signal. The signal processing circuit 23 delivers a data signal to be transmitted to the IC card 10 and to the modulation-demodulation circuit 22. In addition, the signal processing circuit 23 processes a data signal inputted from the modulation-demodulation circuit 22.

In a step of processing the inputted data signal, the signal processing circuit 23 indicates a processing step and a result to a display unit 24 as needed. In addition, the signal processing circuit 23 changes an operation mode, exchanges data during a processing step, and generates a sound signal to a speaker 26 through the instructions inputted from a keypad 28.

Figure 3:
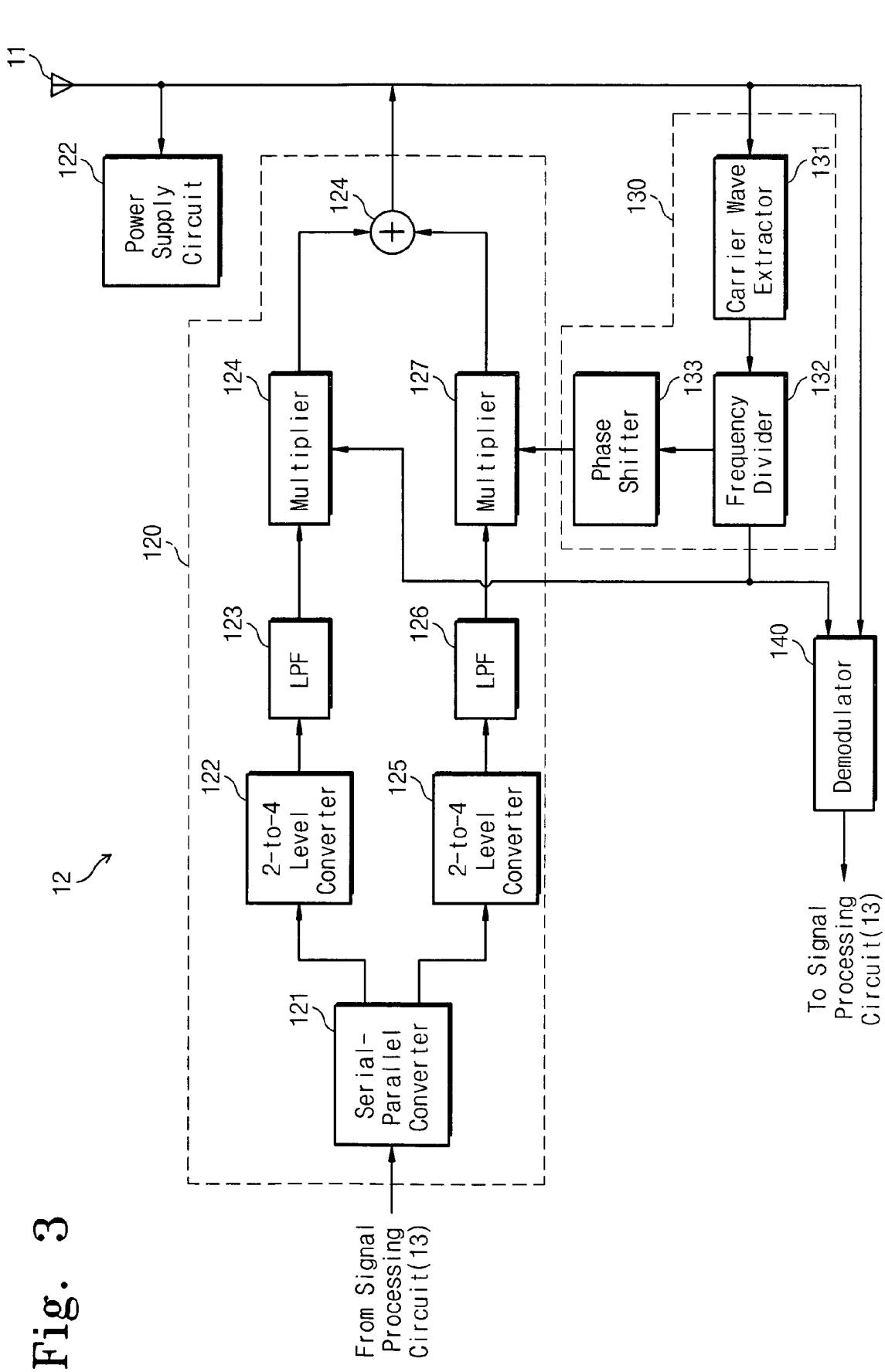
FIG. 3 is a block diagram of a demodulation circuit of the IC card according to the present invention.

FIG. 3 is a block diagram of a modulation-demodulation circuit 12 of an IC card according to an embodiment of the present invention. The modulation-demodulation circuit 12 includes a power supply circuit 110, a modulator 120, a carrier wave signal generator 130 and a demodulator 140.

The power supply circuit 110 provides a DC power to the circuit blocks of the IC card 10. The modulator 120 modulates a transmission data from the signal processing circuit 13 in the manner of QAM to generate a transmission signal. The demodulator 140 demodulates the transmission signal received by the antenna 101 to provide to a signal processing circuit 13. A communication from the card reader in a type of ISO/IEC B to an IC card of non-contact type uses a method of Amplitude Shift Keying (ASK) 10% and a non-return to zero in a Radio Frequency (RF) operation range, such that the demodulator 140 performs the proper demodulation.

A carrier wave signal generator 130 includes a carrier wave extractor 131, a frequency divider 132 and a phase shifter 133, which generates a carrier wave signal for a modulation of the modulator 120 and a demodulation of the demodulator 140. The carrier wave extractor 131 extracts a carrier wave signal from the transmission signal received from the antenna 101. Frequency of the carrier wave signal included in the transmission signal is 13.56 MHz. The frequency divider 132 divides the extracted transmission signal into $1/16$. Therefore, a frequency of the carrier wave signal outputted from the frequency divider 132 is 847 MHz. The phase shifter 133 shifts the carrier wave signal outputted from the demodulator 132 by −90 degrees. Therefore, a phase difference between the carrier wave signal outputted from the frequency divider 132 and the carrier wave signal from the phase shifter 133 is 90 degrees. If the carrier wave signal outputted from the frequency divider 122 is cos ωt, a carrier wave signal outputted from the phase shifter 133 is sin ωt.

The modulator 120 includes a serial-parallel converter 121, level converters 122 and 125, Low Pass Filters (LPF) 123 and 126, multipliers 124 and 127 and a synthesizer 128.

The serial-parallel converter 121 converts a serial data signal from the signal processing circuit 13 to a parallel data signal. For example, the serial-parallel converter 121 outputs a 4-bit parallel data signal. The level converter 122 receives 2-bit data signals I1 and I2 of I channel (inphase channel) from the 4-bit data signals to convert a level of the signal. The data signal I1 determines a polarity of the signal converted by the level converter 122, and the data signal I2 determines the size. For example, if the data signal I1 indicates a logical 1, the polarity of the signal is "+" (positive). If the data signal indicates a logical 0, the polarity of the signal is "−". If the data signal I2 is logical 1, a size of the signal is A. If the data signal is logical 0, the size of the signal is B (where the size of signal A is larger than signal B). That is, the level converter 122 has two kinds of polarity by receiving 2-bit data signals, and generates total four data signals +A, −A, +B and −B.

The data signal outputted from the converter 122 is provided to a multiplier 124 via a filter 123. The multiplier 125 multiplies the carrier wave-signal provided from the frequency divider 132 to an output.

The level converter 125 receives 2-bit data signals Q1 and Q2 of the quadrature channel (Q channel) from the four-bit data signals outputted from the serial-parallel converter 121 to convert a level of the signal. The data signal Q1 determines a polarity of the signal converted by the level converter 125 and a size of the data signal Q2. For example, if the data signal Q1 is logical 1, the polarity of the signal is "+", and if it is logical 0, the polarity of the signal is "−" (but, A>B). That is, the level converter 125 receives 2-bit data signals to generate total four data signals having two kinds of polarities and two kinds of size.

The data signal outputted from the converter 125 is provided to a multiplier 127 via a filter 126. The multiplier 127 multiplies the carrier wave signal provided from the phase shifter 133 before sending it to the output. The carrier wave signal provided from the phase shifter 133 has a phase difference of 90° from the carrier wave signal outputted from the frequency divider 132.

Figure 5:
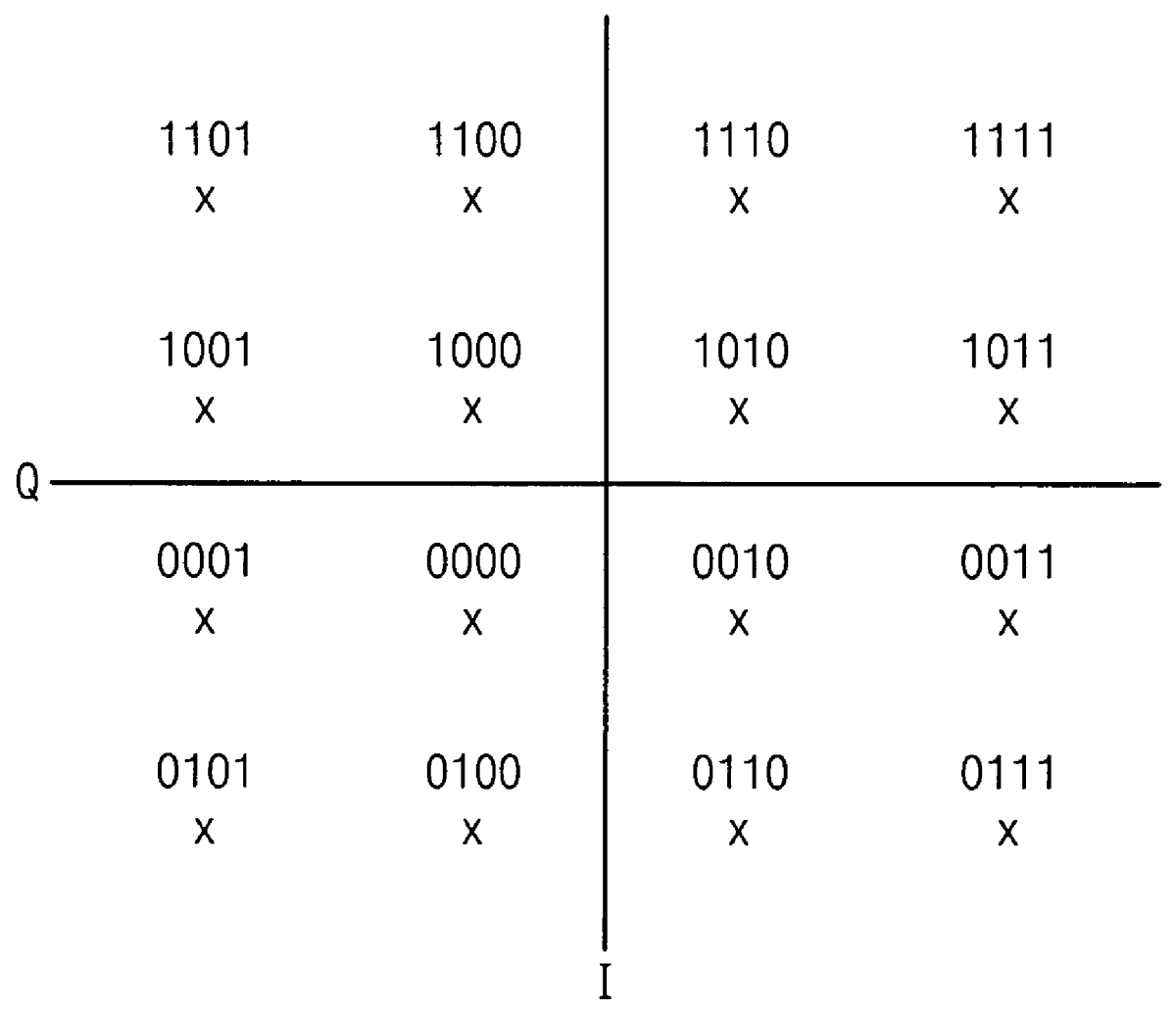

The synthesizer 128 synthesizes signals outputted from the multiplier 124 and 127. The transmission signal outputted from the synthesizer 128 is transmitted to a card reader through an antenna 101. The transmission signal outputted from the synthesizer 128 is a signal linearly composed of I channel and Q channel signals, and is illustrated in FIG. 5 as a phasor drawing. A bandwidth efficiency of the signal modulated in the manner of M-state is $\log_2$Mbps/Hz. Therefore, the efficiency of bandwidth is 4 bps/Hz according to hexadecimal QAM modulator 120 as illustrated in FIGS. 3 and 5. When a transfer rate of the IC card according to the ISO 14443 type-B is 424 Kbps, the transfer rate of the IC card of the present invention is 424 Kbps*4=1,696 Kbps.

In an embodiment of the present invention, a hexadecimal QAM is referred to as one example, but can be modified into various types such as 32 QAM, 64 QAM, etc. As the value of M increases, the transfer efficiency becomes higher.

Figure 4:
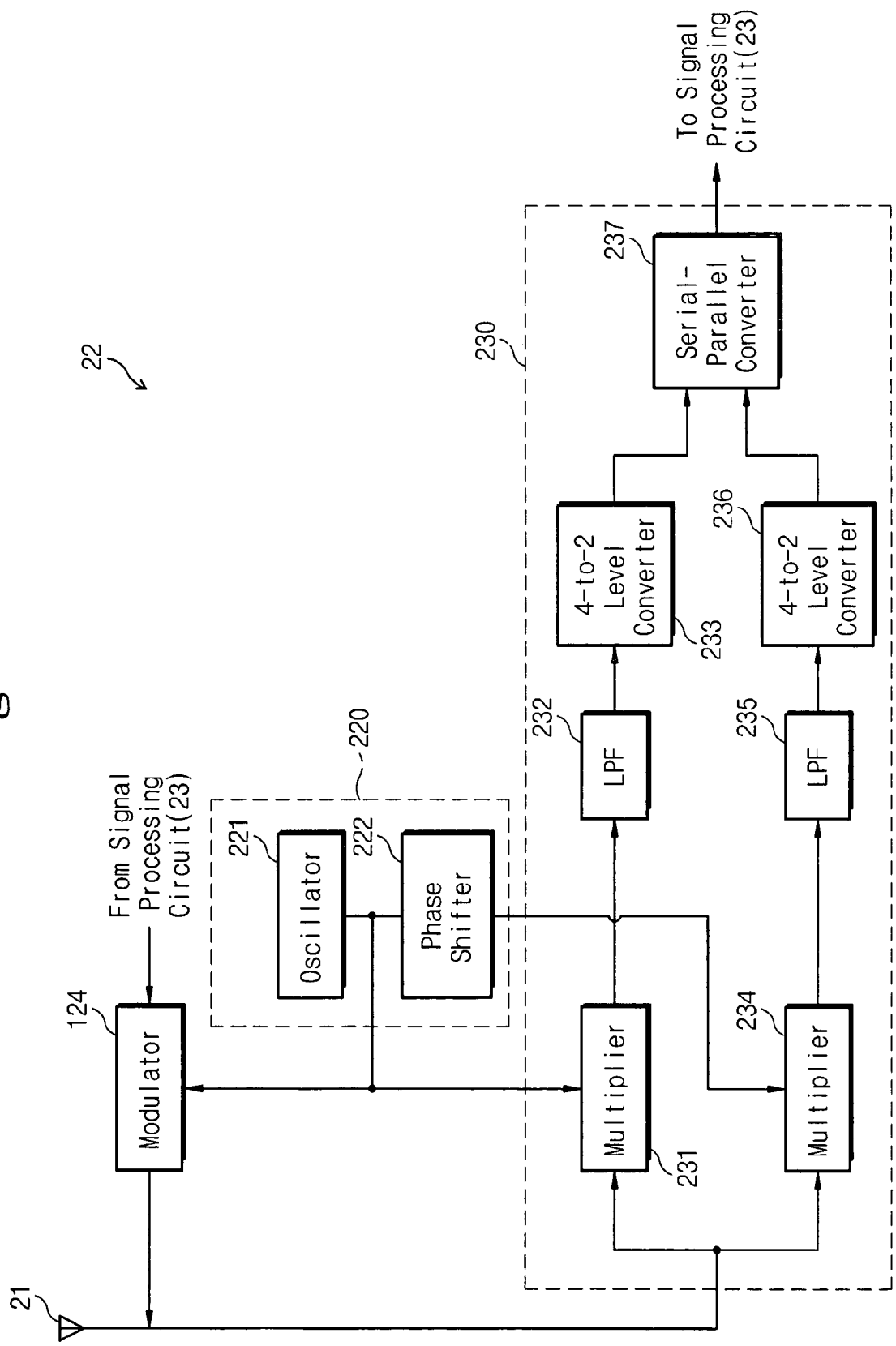
FIG. 4 is a block diagram of a demodulation circuit of a card reader in FIG. 2.

FIG. 4 is a block diagram illustrating a demodulator circuit of the card reader in FIG. 2. The demodulator circuit 22 includes an antenna 201, a modulator 210, an oscillator circuit 220 and demodulator 230.

The oscillator circuit 220 includes an oscillator 221 and a phase shifter 222. The oscillator 221 generates a carrier wave signal of 847 KHz. The phase shifter 222 shifts a phase of the carrier wave signal generated from the generator 221 by −90 degrees to output the same. For example, if the carrier wave signal outputted from the oscillator 221 is cos ωt, the carrier wave signal generated from the phase shifter 222 is sin ωt. The carrier wave signals outputted from the oscillator circuit 220 are used in the modulator 210 and the modulator 230.

The modulator 120 modulates a transfer data from the signal processing circuit 23 into a carrier wave signal to generate a transmission signal. The communication from a card reader according to ISO/IEC B type to a non-contact IC card uses an ASK 10% modulation method and NTZ method in a RF operation region, such that the modulator 120 performs a proper modulation.

The demodulator 230 demodulates the signal received by the antenna 201. As described above, the IC card generates a transmission signal by demodulating in the manner of QAM.

The demodulator 230 includes multipliers 231 and 234, filters 232 and 235, level converters 233 and 236 and a parallel-serial modulator 237. The multiplier 231 multiplies the transmission signal received by the antenna 201 by the carrier wave signal generated from the transmission signal. The signal outputted from the multiplier 231 is to provide a level converter 233 through a filter 232. The level converter 233 converts a transmission signal having one of the four levels (i.e., +A, −A, +B and −B) to a 2-bit data signal.

The multiplier 234 multiplies the transmission signal received by the antenna 201 by a carrier wave signal generated from the phase shifter 222. The signal generated from the multiplier 234 is provided to the level converter 236 through the filter 235. The level converter 236 converts a transmission signal having one of the inputted four levels (+A, −A, +B, and −B) into a 2-bit data signal.

The parallel-serial converter 237 makes a 2-bit data signal from the level converter 233 and a 2-bit data signal from the level converter 236 composed of a 4-bit parallel data signal, and generates a serial data signal. A serial data signal from the parallel-serial converter 237 is provided to the signal processing circuit 23. The QAM signal is entirely demodulated.

According to the present invention, a transfer rate of the data signal transmitted from an IC card to a card reader is improved. Especially, BPSK modulation method by a type-B expressed in the ISO 14443 generates only 1-bit during an interval of 1-bit, but the M number system QAM modulation method may transfers $\log_2$ M bits during a 1-bit duration.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. An IC card comprising:

a signal processing circuit;

a modulator for performing Quadrature Amplitude Modulation (QAM) on a data signal received from the signal processing circuit and generating a transmission signal; and an antenna for transmitting the transmission signal modulated by the modulator, wherein the modulator comprises:

a serial-parallel converter for converting a serial signal received from the signal processing circuit to a parallel signal;

a first level converter for converting a level of a first channel signal received from the serial-parallel converter; and a first multiplier for modulating the level-converted signal received from the first level converter with a first carrier wave signal and outputting a first modulating signal;

a second level converter for converting a level of a second channel signal from the serial-parallel converter;

a second multiplier for modulating the level-converted signal from the second level converter with a second carrier wave signal and outputting a second modulating signal; and a synthesizer for synthesizing the first modulating signal from the first multiplier and the second modulating signal from the second multiplier.

2. The IC card of claim 1, further comprising:

a carrier wave extractor for extracting the first carrier wave signal from a reception signal received from the antenna; and a phase shifter for generating the second carrier wave signal by shifting the phase of the first carrier wave signal.

3. The IC card of claim 1, further comprising:

a demodulator for demodulating a reception signal received by the antenna and providing the demodulated data signal to the signal processing circuit.

4. The IC card of claim 3, wherein the demodulator performs an Amplitude Shift Keying (ASK) 10% modulation and a Non-Return to Zero (NRZ) coding according to a standard of ISO/IEC B type.

5. An IC card processor, comprising:

a signal processing circuit;

an antenna; and a demodulator for demodulating a reception signal received by the antenna in the manner of Quadrature Amplitude Modulation (QAM) and providing the demodulated data signal to the signal processing circuit, wherein the demodulator comprises:

a first multiplier for multiplying the reception signal received by the antenna by a first signal;

a first level converter for converting a level of the signal from the first multiplier;

a second multiplier for multiplying a signal received by the antenna by a second signal;

a second level converter for converting a level of signals outputted from the second multiplier; and a serial-parallel converter for receiving a signal from the first and second level converters to output a serial signal, wherein the serial signal is restored from the signal transmitted from the IC card.

6. The IC card processor of claim 5, further comprising:

a generator for generating the first signal of a predetermined frequency; and a phase shifter for generating the second signal by shifting a phase of the first signal.

7. The IC card processor of claim 5, further comprising:

a modulator for modulating a signal to transmit to the IC card.

8. The IC card processor of claim 7, wherein the modulator modulates an Amplitude Shift Keying (ASK) 10% modulation and a Non-Return to Zero (NRZ) coding according to a standard of ISO/IEC B type.

9. An IC card system, comprising:

an IC card processor and an IC card, wherein the IC card comprises:

a first antenna;

a quadranture modulator circuit that performs quadrature amplitude modulation (QAM) of orthogonal carrier wave signals having frequency F1 with data transmission signals to generate QAM modulated signal which is wirelessly transmitted from the first antenna to the IC card processor; and a carrier wave signal generator that generates the orthogonal carrier wave signals of frequency F1 by frequency dividing by 1/16 a transmission carrier wave signal of frequency F2 that is extracted from a transmission signal received on the first antenna from the IC card processor; and phase shifting the extracted signal by −90 degrees;

wherein the IC card processor comprises:

a second antenna; and a quadrature demodulator circuit that demodulates the QAM modulated signal transmitted from the IC card to extract the data transmission signals of the IC card, wherein the IC card processor comprises a modulator that modulates the transmission carrier wave signal of frequency F2 with a data transmission signal generated by the IC card processor to generate a modulated signal that is transmitted from the second antenna of the IC card processor to the IC card; and wherein the IC card comprises a demodulator circuit that demodulates the modulated signal transmitted from the IC card processor to extract the data transmission signal of the IC card processor.

10. The IC card system of claim 9, wherein the modulator and demodulator circuits perform Amplitude Shift Keying (ASK) 10% modulation and a non-return to zero (NZR) coding according to a standard of ISO/IEC B type.

11. An IC card system, comprising:

an IC card processor; and an IC card; comprising:

a first antenna, and a quadrature modulator circuit that performs quadrature amplitude modulation (QAM) of orthogonal carrier wave signals with data transmission signals generated by the IC card to generate a QAM modulated signal which is wirelessly transmitted from the first antenna to the IC card processor; and a carrier wave signal generator that generates the orthogonal carrier wave signals of frequency F1 by frequency dividing by 1/16 a transmission carrier wave signal of frequency F2 that is extracted from a transmission signal received on the first antenna from the IC card processor and phase shifting the extracted signal by −90 degrees; and a second antenna, and a quadrature demodulator circuit that demodulates the QAM modulated signal transmitted from the IC card to extract the data transmission signals of the IC card, wherein the IC card processor further comprises a modulator circuit that modulates a transmission carrier wave signal with a data transmission signal generated by the IC card processor to generate a modulated signal that is transmitted from the IC card processor to the IC card; and wherein the IC card comprises a demodulator circuit that demodulates the modulated signal transmitted from the IC card processor to extract the data transmission signal of the IC card processor; and wherein the modulator and demodulator circuits perform Amplitude Shift Keying (ASK) 10% modulation and a non-return to zero (NRZ) coding according to a standard of ISO/IEC B type.

* * * * *